United States Patent [19]

Hartman

[11] Patent Number: 4,950,066
[45] Date of Patent: Aug. 21, 1990

[54] EYEGLASSES HAVING DEMOUNTABLE FUNCTIONAL AND DECORATIVE ELEMENTS

[76] Inventor: James Hartman, 904 Elmwood Trail, Cedar Park, Tex. 78613

[21] Appl. No.: 268,938

[22] Filed: Nov. 7, 1988

[51] Int. Cl.$^5$ .................... G02C 1/04; G02C 11/02; G02C 5/02
[52] U.S. Cl. ............................... 351/106; 351/52; 351/133
[58] Field of Search ............ 351/41, 51, 52, 110, 351/124, 133, 103–106, 125

[56] References Cited

U.S. PATENT DOCUMENTS

| | | |
|---|---|---|
| D. 293,450 | 12/1987 | Jannard . |
| 3,701,591 | 10/1972 | Wichers . |
| 4,322,138 | 3/1982 | Minart . |
| 4,371,238 | 2/1983 | Lhospice . |
| 4,521,090 | 6/1985 | Pierquin . |
| 4,592,629 | 6/1986 | Giacomelli . |
| 4,674,851 | 6/1987 | Jannard . |
| 4,685,782 | 8/1987 | Lhospice . |

FOREIGN PATENT DOCUMENTS

| | | | |
|---|---|---|---|
| 2852199 | 6/1980 | Fed. Rep. of Germany | ........ 351/52 |
| 3503644 | 4/1986 | Fed. Rep. of Germany | ........ 351/41 |
| 630619 | 10/1949 | United Kingdom | ................ 351/110 |

*Primary Examiner*—Rodney B. Bovernick
*Attorney, Agent, or Firm*—Thomas P. Mahoney

[57] ABSTRACT

Eyeglasses incorporating interchangeable functional and decorative elements affecting every aspect of the glasses, including the lenses, bridge and temples. All of the elements are readily demountable and reinsertable in operative relationship with one another to permit the rapid interchange of lenses and associated decorative elements to provide for functional accommodation and esthetic variation.

10 Claims, 3 Drawing Sheets

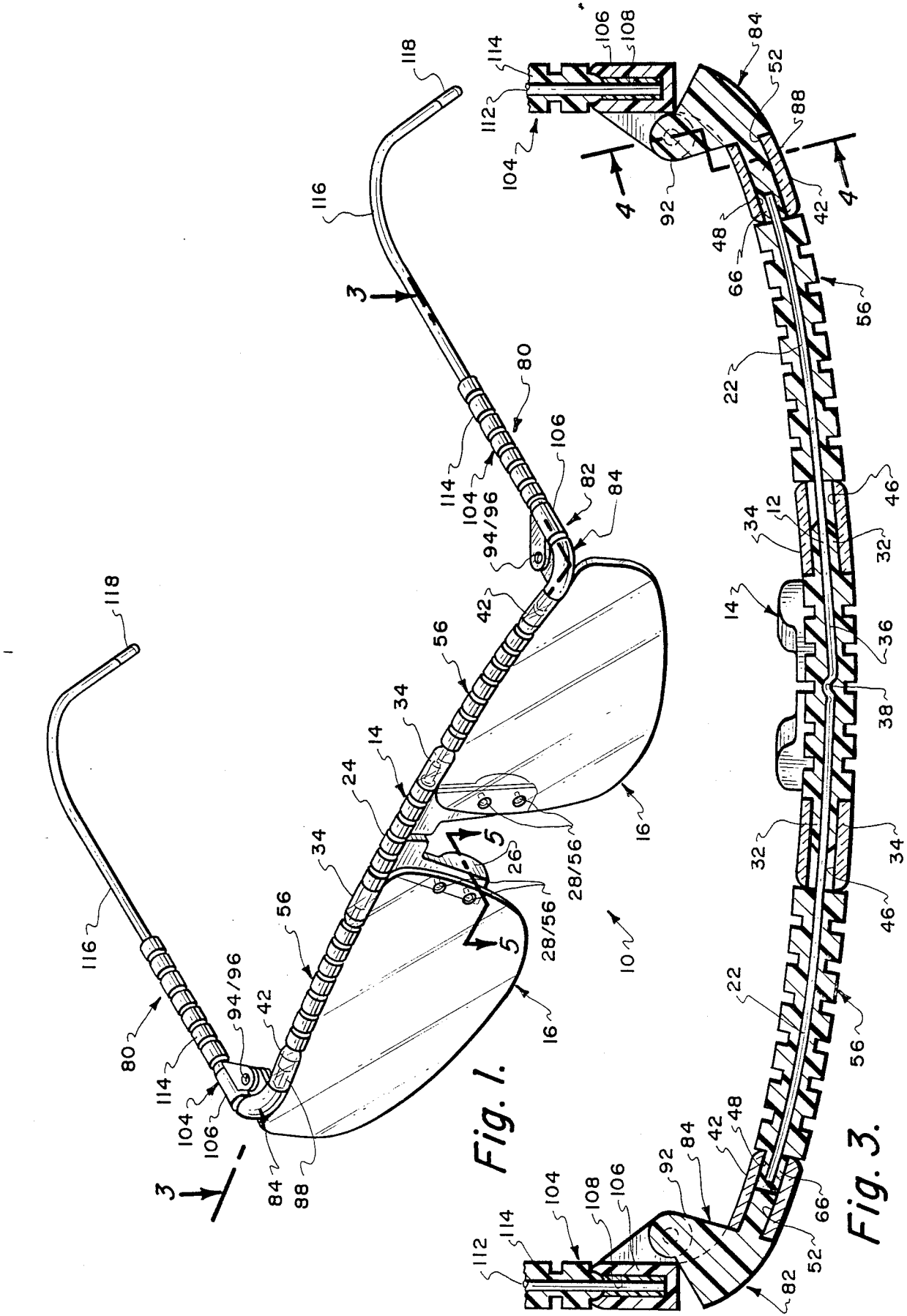

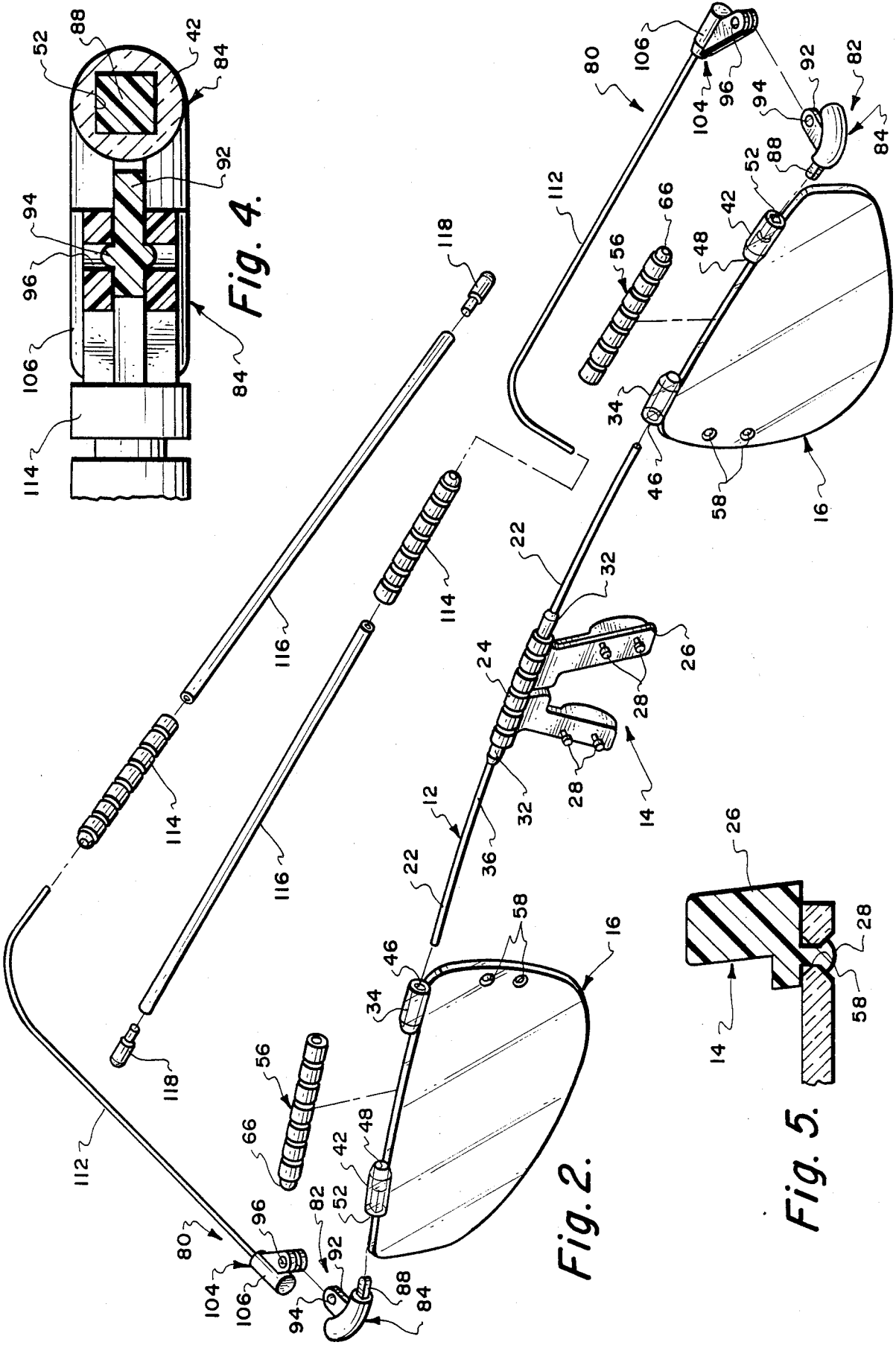

4,950,066

1

EYEGLASSES HAVING DEMOUNTABLE FUNCTIONAL AND DECORATIVE ELEMENTS

BACKGROUND OF THE INVENTION

This invention relates to eyeglasses and, more particularly, to eyeglasses incorporating a combination of demountable functional and decorative elements to achieve both functional and decorative variation for and by the wearer of said eyeglasses.

There have been numerous attempts in the prior art to provide for interchangeability of functional components of eyeglasses. Typical of the prior art are the teachings of U.S. Letters Pat. 4,674,851, which shows a lens demountable from a bridge structure, but in all other respects is essentially conventional in construction.

Relevant are the teachings of U.S. Pat. No. 4,521,090, which teaches a lens supporting structure or bridge having a lens assembly mountable thereupon and incorporating demountable temples engageable with said bridge.

However, none of the prior art teaches functional interchangeability and demountability whereby the lens and other functional components can be readily changed and, in addition, the demountability of various decorative elements associated with the bridge and with the temples.

OBJECTS AND ADVANTAGES OF THE INVENTION

It is, therefore, an object of my invention to provide eyeglasses having bridge means incorporating a nose piece, said bridge means and incorporated nose piece constituting the basic structure of the eyeglasses. An additional object of my invention is the provision of a bridge of the aforementioned character wherein the bridge is constituted by oppositely disposed supporting elements fixedly mounted on the nose piece and capable of demountably supporting interchangeable lenses.

A further object of my invention is the provision of eyeglasses of the aforementioned character in which decorative elements are provided cooperative with said bridge and said lenses to enhance the appearance of said bridge.

A further object of my invention is the provision of eyeglasses of the aforementioned character in which said lenses and said nose piece have cooperative positioning means for locating said lenses on said bridge and preventing the inadvertent dislocation of said lenses or the aforesaid decorative elements from operative relationship with said bridge.

An additional object of my invention is the provision of eyeglasses of the aforementioned character in which demountable temples are provided and maintained in operative relationship with said eyeglasses by supporting means on said lenses.

Another object of my invention is the provision of eyeglasses of the aforementioned character in which said temples incorporate demountable temple hinge means and are capable of receiving a plurality of demountable operative and decorative elements.

BRIEF DESCRIPTION OF THE DRAWINGS

Other objects and advantages of my invention will be apparent from the following specification and the accompanying drawings, which are for the purpose of illustration only and in which:

FIG. 1 is a view showing an embodiment of the eyeglasses of the invention;

FIG. 2 is an enlarged exploded view showing the disassembled relationship of the various demountable functional and decorative components of the glasses of FIG. 1;

FIG. 3 is a sectional view taken on the broken line 3—3 of FIG. 1;

FIG. 4 is a sectional view taken from the broken line 4—4 of FIG. 3;

FIG. 5 is a sectional view taken from the broken line 5—5 of FIG. 1; and

DESCRIPTION OF THE PREFERRED EMBODIMENTS OF THE INVENTION

Figure 6:
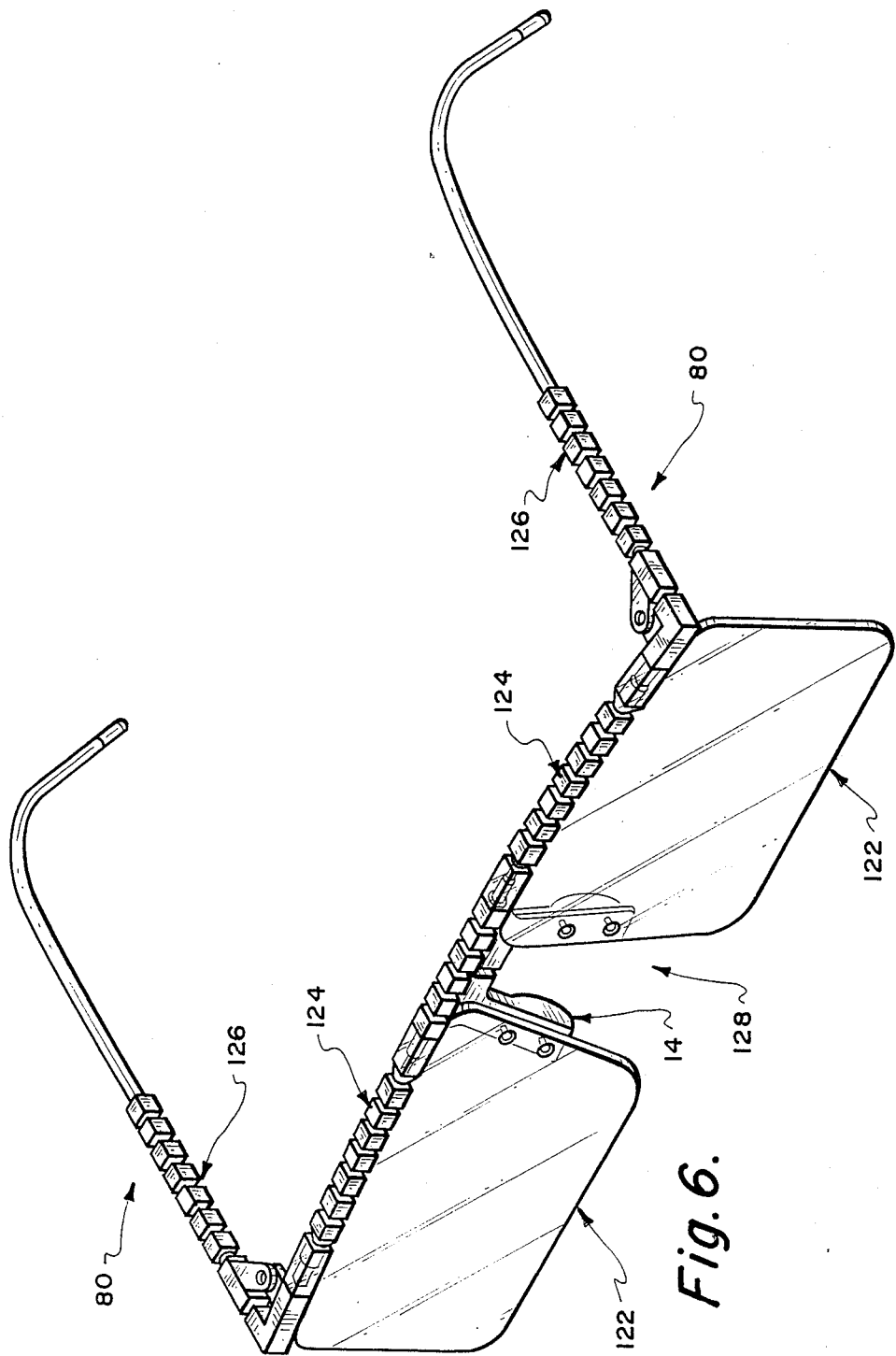
FIG. 6 is a view showing the eyeglasses of the invention incorporating different lenses and decorative and functional components.

Referring to the drawings, and particularly to FIGS. 1-5 thereof, I show a pair of spectacles 10, said spectacles, FIG. 3, incorporating a bridge member 12 having a nose piece 14. Operatively and demountably associated with the bridge member 12 is a pair of lenses 16 of predetermined configuration, ophthalmic correction, coloration and the like.

The bridge 12, as best shown in FIGS. 2 and 3 of the drawings, is a composite structure constituted by an injection molded plastic nose piece 14 having bridge elements 22 formed of wire, or the like. In the present embodiment of the invention, the nose piece may be formed of a wide variety of different types of thermo-setting synthetic resins, such as polyethylene, acrylic and the like.

The wire bridge elements 22 are formed from titanium primarily to permit bending and deformation of the same to cause the contour of said elements to follow the contour, if desired, of the face of the wearer of the glasses 10.

It is conceivable that the nose piece 14 be fabricated from other materials and, of course, that the bridge elements 22 be formed integrally with the nose piece 14 from the same materials as the nose piece 14. The nose piece 14 has an upper integral decorative pattern indicated at 24 and nose pad arms 26 which incorporate integral positioning studs 28, for a purpose which will be described in greater detail below.

In the manufacture of the bridge 12 the wire bridge elements 22 are formed from a single wire and are located in the mold in such a manner that the nose piece 14 is cast about the extremities of the wires constituting the bridge elements 22 to maintain them in permanent operative relationship with said bridge elements. At the operative extremities of the decorative upper portion of the nose piece 14 are reduced bosses 32, said bosses being of cylindrical cross section, as best shown in FIGS. 2 and 3 of the drawings, and adapted to receive inner mounting bosses 34 of the lenses 16 which, together with identical outer mounting bosses 42 constitute the mounting means for the lenses 16 whereby the lenses 16 can be readily dismounted from operative relationship with the bridge 12, in a manner to be described in greater detail below.

The wire bridge elements 22, as previously described, constitute the opposite extremities of a single piece of wire 36 and the central portion of said wire is crimped at 38 within the plastic body of the decorative upper extremity 24 of the nose piece 14 to insure that said wire will not be displaced from operative relationship with the nose piece 14.

The lens mounting bosses 34 and 42 are generally cylindrical in outer configuration, the inner bosses 34 having cylindrical through bores 46 which receive the bosses 32 provided on the upper, decorative portion 24 of the nose piece 14.

The outer mounting bosses 42 have cylindrical bores 48 at their inner extremities and square bores 52 at their outer extremities, as best shown in FIGS. 2 and 3 of the drawings.

Mounted on the wire bridge elements 22 intermediate the mounting bosses 34 and 42 are separable and demountable decorative elements 56 which may be designed to conform in appearance and color with the nose piece upper extremity 24 or which may be arbitrarily selected from a different variety of patterns which are readily available for mounting between the mounting bosses 34 and 42.

In addition to incorporating the integral mounting means constituted by the inner and outer bosses 34 and 42, respectively, the lenses incorporate openings 58 in the inner edges thereof, said openings being adapted to receive the corresponding studs 28 which are slightly deformable and which snap through the openings 58 to position the lenses 16 in operative relationship with the nose piece 14 and, thus, constitute the positioning means for the lenses. The decorative elements 56 incorporate protuberances 66 at the outer extremities thereof which interfit with the cylindrical bore portions 48 of the outer mounting bosses 42 of the lenses 16.

A temple assembly 80 is mounted on each lens 16 and includes a demountable hinge 82 consisting of hinge leaves 84 and 104. The hinge leaf 84, as best shown in FIGS. 1-3, has a curvilinear shape and is provided with a boss 88 of square cross section which interfits with the correspondingly shaped square bore 52 in the associated outer mounting boss 42.

The hinge leaf 84 has a lug 92 which incorporates oppositely disposed, hemispherical bosses 94 adapted to engage in corresponding openings 96 in the hinge leaf 104. The hinge leaf 104 has a barrel 106 which incorporates a rectangular bore 108 for the reception of the demountable temple assembly 80.

The temple 80 includes a length of wire 112 upon which is threaded a decorative cylinder 114 and a tubular plastic shroud 116, a cap 118 being provided for reception on the end of the wire 112. The wire 112 may be fabricated from titanium, but it is obvious that the utilization of different types of materials is contemplated and within the scope of the invention.

Shown in FIG. 6 are eyeglasses 120 fabricated and assembled in accordance with the teachings of the invention. The eyeglasses incorporate the bridge member 12 and nose piece 14 of the basic eyeglass structure and also utilize the basic temple construction 80. However, different lenses 122 are mounted in operative relationship with the bridge to illustrate the manner in which lenses of different configuration, color or ophthalmic correction can be readily substituted for the lenses 16. In addition, the decorative elements indicated generally at 124 and 126 on the bridge and temples, respectively, have been substituted for the decorative elements of the eyeglasses 10. In other words, the basic mechanical components, bridge and temples, of the eyeglasses remain the same, but the entire appearance and esthetic effect are altered together with the functional aspect of the lenses in addition to their appearance.

It will be readily apparent that the initial assemblage of a typical pair of eyeglasses from selected lens pairs and decorative elements involves the utilization of the bridge 12 upon which the bosses 34 and 42 constituting the mounting means for the lenses are assembled together with the respective decorative elements, such as the decorative elements 56. At this time, the positioning means between the lenses 16 and the nose piece 14 are engaged to securely position the lenses in their respective locations on the bridge and to prevent the inadvertent dislodgement therefrom.

The hinges 84 for the temples 80 are then inserted in operative and demountable relationship with the mounting bosses 42 after the various decorative elements of the temples have been assembled thereupon.

It will be obvious to those skilled in the art that various of the elements, both functional and decorative, can be materially altered in appearance, shape and raw materials without departing from the spirit of the invention and the claims appended hereto.

I claim:

1. In a pair of eyeglasses, the combination of:
   a bridge member having wire line lens mounting elements extending laterally therefrom; and
   a pair of lenses mounted on said elements, each lens having mounting means thereupon rotatable and slidable on said elements to permit said lenses to be readily removed from operative relation with said elements.

2. The eyeglasses of claim 1 in which said bridge has a nose piece and said lenses and said nose piece have cooperative snap positioning mean for maintaining said lenses in demountable operative relationship with said bridge member.

3. In a pair of eyeglasses, the combination of:
   a nose piece; laterally extending bridge elements having reduced cylindrical crosssections mounted on opposite sides of said nose piece; a pair of lenses demountably positioned on said bridge elements having lens mountings on their upper edges engageable with said bridge elements, said lens mountings being rotatable and slidable on said elements; and a pair of temples having hinges demountably secured to said lenses.

4. The eyeglasses of claim 3 in which snap positioning means are provided on said lenses and said nose piece to maintain said lenses in demountable operative relationship with said bridge elements.

5. In a composition eyeglass construction, the combination of:
   a bridge having a nose piece mounted centrally thereof said bridge having a lens mounting elements of reduced cylindrical crosssection extending therefrom; and
   a lens pair demountably supported on said bridge on opposite sides of said nose piece, each lens having mounting means thereupon rotatable and slidable on said bridge to permit said lenses to be readily removed from operative relation with said bridge.

6. The eyeglasses of claim 5 in which demountable decorative elements are located on said bridge above said lenses adjacent said mounting means.

7. The eyeglasses of claim 5 in which said lenses and said nose piece have cooperative positioning means for locating said lenses on said bridge.

8. The eyeglasses of claim 5 in which said mounting means have corresponding cylindrical bores for the reception of said bridge portion.

9. The eyeglasses of claim 5 in which said mounting means consists of inner and outer spaced mounting members engageable with said bridge and said outer members incorporate temple hinge locating means.

10. The eyeglasses of claim 9 in which said temple hinge locating means is constituted by a socket in each of said lens outer spaced mounting members and a protrusion on each of said temple hinges demountably receivable in each of said sockets.

* * * * *